(No Model.)
P. SEIBEL.
Beer Cooler.
No. 231,934. Patented Sept. 7, 1880.
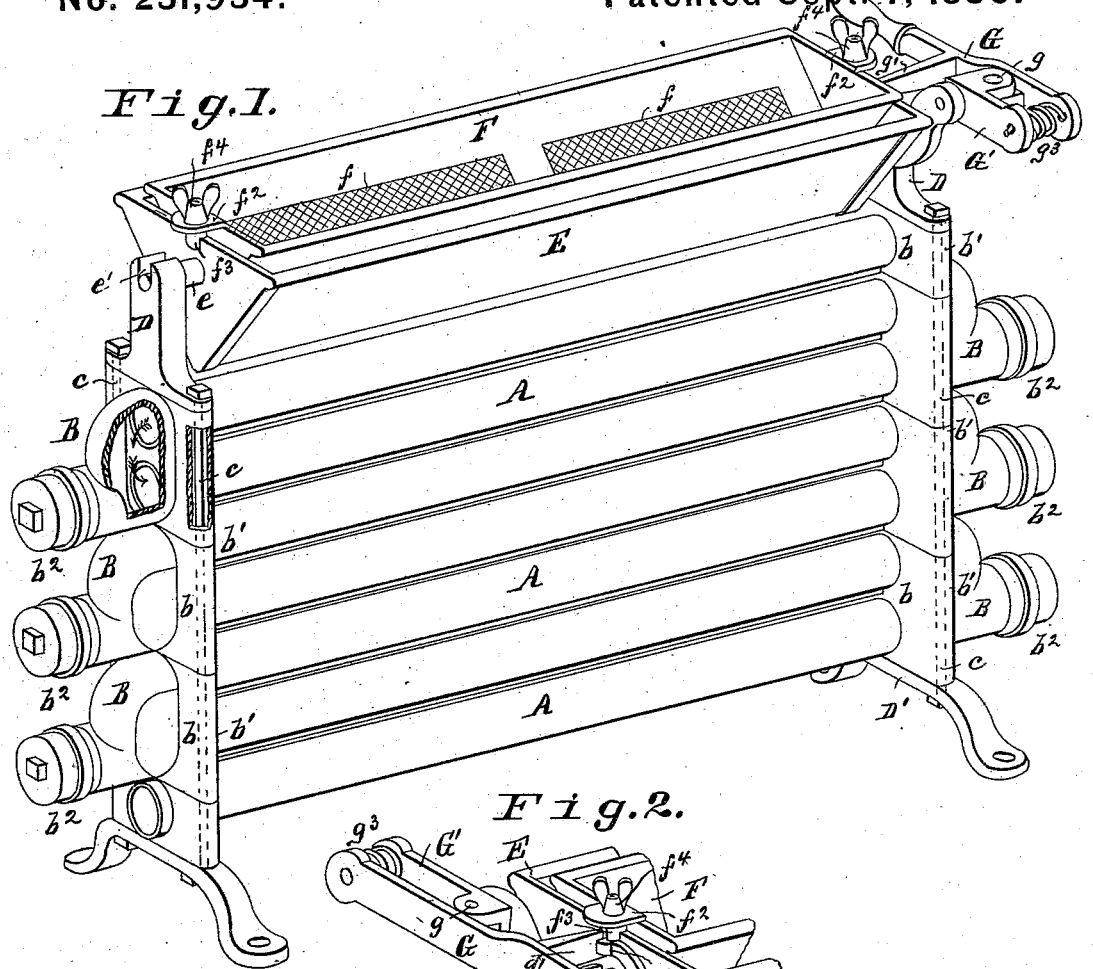
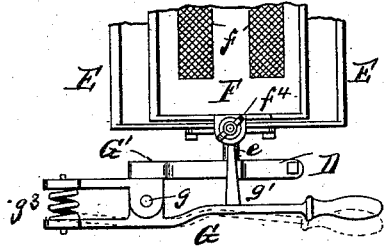
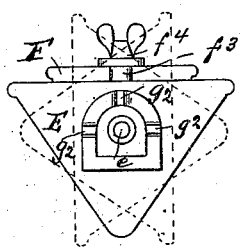
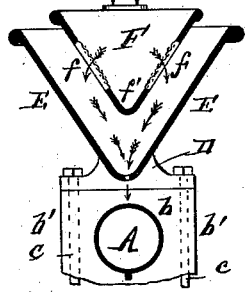
Attest:
Charles Pickles
John W. Herthel
Inventor
Phillip Seibel
per Herthel & Co.

UNITED STATES PATENT OFFICE.

PHILLIP SEIBEL, OF ST. LOUIS, MISSOURI.

BEER-COOLER.

SPECIFICATION forming part of Letters Patent No. 231,934, dated September 7, 1880.

Application filed June 1, 1880. (No model.)

*To all whom it may concern:*

Be it known that I, PHILLIP SEIBEL, of St. Louis, in the State of Missouri, have invented a new and useful Improved Beer-Cooler, of which the following is a specification.

My invention consists of a beer-cooler with elbows cast or provided with sleeves instead of projections or lugs on their upper and lower sides.

Constructing the elbows with the sleeves enables me, first, to completely hide the upright rods or means employed to join the apparatus together; secondly, to protect said rods or parts from the oxidizing effects of the beer. The latter in my beer-cooler cannot come in contact with the parts contained in or passing through the sleeves of the elbows. Hence my beer-cooler is rendered more durable, easier cleansed, and the beer is not liable to the effects of rust, &c. Further, the elbows, with sleeves, when joined one above the other, form closed sides in continuous surface of metal projecting from the plane of the series of longitudinal pipes at their opposite ends. Thus the beer is kept confined between the said opposite closed sides or sleeves of the elbows, and the flow or passage of the beer takes place only over and along the cooling-pipes.

My invention also consists in providing the usual top trough with a further duplicate smaller trough having perforations through which the beer percolates and collects in the outer trough, and by means whereof the sediment and impurities can be caught or collected at the bottom of the inside trough.

My invention further consists in pivoting the two top troughs, that both together can have a pivotal or tilting action to facilitate the cleansing of said troughs.

My invention also consists in combining with the top pivoted trough a hand-lever and its parts to secure the trough or troughs in any adjusted positions, enabling the operator the better to manipulate said troughs, to repair, cleanse same, direct the flow of beer over the cooling-pipes, &c.

I attain these objects by the mechanism illustrated in the accompanying drawings, in which—

Figure 1 is a perspective view of my complete beer-cooler as ready for application and use, the parts broken away being to show interior parts. Fig. 2 is a perspective view of the corner of the top troughs, showing the hand-lever and its connection with the end of the outer trough. Fig. 3 is a plan view of the same parts shown in Fig. 2. Fig. 4 shows an end view of the top troughs, the dotted lines representing the troughs tilted to either side; and Fig. 5 is a sectional elevation through both troughs and the top cooling-pipe, the arrows indicating the direction of the flowing beer.

Similar letters refer to similar parts throughout the several views.

A represents the series of longitudinal pipes through which the water or cooling liquid passes.

B represents my improved elbow to join the opposite end of the pipe A.

As seen in Fig. 1, that portion of the elbow marked $b$ is properly a sleeve, instead of being lugs having holes through which the upright rods pass from the bottom to top, exposed to the action of the beer, and as is ordinarily used in beer-coolers.

My object, as before stated, is to completely hide the upright rods and prevent the oxidizing effect of the beer, which impairs and destroys the durability of said rods and their joints to other parts—in short, to prevent the formation of rust and its injurious consequences. To completely hide the rods, this I accomplish by casting each elbow B to have the sleeve $b$, as aforesaid; further, as shown in Fig. 1, by successively joining each elbow with its sleeve, the one top of the other, at the opposite ends of the cooling-pipes.

Each sleeve $b$ has its outer surface of metal extending at right angle the whole vertical length of each elbow. Therefore when each elbow with its sleeve is placed and joined top of the other the said outer surface of metal exists as a continuation from the top to the lowest elbow, forming the respective closed sides, (marked $b'$,) and which project beyond the circumference of the pipes, as indicated in Figs. 1, 5. These closed sides $b'$ confine the flow or passage of the beer simply along the series of pipes A. Secondly, the hollow of said closed sides or sleeves completely incloses the upright rods *c*. The respective rods *c* are simply passed through each sleeve *b* from the lowest elbow to the highest, each rod being tightened at the top to the trough-supports D and at bottom to the legs D', as clearly shown in Fig. 1.

The pipes A each connect to the sleeves of the elbows B in the consecutive order indicated in Fig. 1, the inlet for the water taking place at one end of the topmost pipe and flowing through all the said pipes in the downward direction, as per the arrows.

The ends of each elbow are closed with the usual screw-cap $b^2$ when the beer-cooler is in operation, and by unscrewing said caps the inside of each pipe can be got at. All the pipes A, elbows B, together with the top-supports D and legs D', can then be joined firmly and in the most lasting manner. At same time each upright rod *c* is not exposed to the action of the beer, and the latter can be kept, confined, and guided in its flow over the outside of the pipes within the closed sides $b'$. The outside of all the parts last named can also be better got at with the brush and kept in a more cleanly condition.

E is the usual V-shaped top trough. As here shown, I provide the trough E with end journals, *e*, fitted to engage the open bearings $e'$ at the top of each trough-support. The trough E thus pivoted is capable of a tilting action, or the operator can tilt it to assume either of the positions at one side or the other, as shown by the dotted lines in Fig. 4.

I provide inside of the top trough the further duplicate-shaped trough F, for the purpose of straining and purifying the beer preparatory to its further flow into the outside trough; also, said inside trough is a means to catch and collect the sedimentary or impure matter.

The sides of the inside trough, F, I provide with gauze strainers *f*, and I leave closed the bottom edge, $f'$, of said trough, in order to collect the impurities. (See Figs. 1, 2, 3, and 5.)

In Fig. 5 it is shown that the direction for the flow of the beer from the inside trough is first through its strainers *f*, thence between the V space existing between both of the troughs; thence the beer flows out of the usual perforations existing at the bottom of the outside trough.

The beer so directed in its flow is therefore subjected to the action of the strainers *f*, the sediment or impurities made to gravitate or collect way at the bottom of the inside trough, while the purer beer flows through the apparatus.

The inside trough is secured in proper position by fittting its lugs at $f^2$ to engage the end pins, $f^3$, (seen at the top of the outer trough,) and securing the joint by the set-screws $f^4$ in manner shown in Figs. 1, 2, 3, 4, 5.

As apparent, the inside trough is capable of being tilted with the outside trough. I have, however, provided the following hand-lever and its connections to the outer trough, in order that the operator can secure the troughs in proper position to direct and equalize the passage of the beer over both sides of the pipes A, and also secure the troughs in any of the adjusted positions for the better cleansing of said troughs.

G is the hand-lever. It is pivoted at *g* to the extension G', which is part of one of the trough-supports. (See Figs. 1, 2, 3.) The hand-lever has a projecting arm, $g'$, fitted to engage any of the slotted lugs existing at the end of the outer trough, and marked $g^2$, and shown more clearly in Figs. 2, 4.

At $g^3$ is a spring, (see Figs. 1, 2, 3,) the tension of which keeps the hand-lever, by its arm $g'$, in engagement with the outer trough. Therefore, to adjust the trough or troughs to assume either of the positions to the right or left shown by the dotted lines in Fig. 4, the hand-lever is forced outward to disengage the hold of its arm $g'$ from the lug $g^2$. This done, said trough can be tilted and secured in any adjusted position desired by the engagement of the arm $g'$ of the lever with the proper lug $g^2$, the tension of the spring holding the parts firm. The troughs can by these means always be kept true in position with relation to the pipes A to achieve as equal a flow of the beer on both sides of the cooler as possible; also, the handling, charging, and cleansing of said troughs is rendered easier and can be done better.

I am aware that beer-coolers have been made of upright duplicate sections, each section consisting of a tier of semi-cylinders having their ends in communication by pipe-bends, the beer flowing outside and inside over the said semi-cylinders and bends containing the cooling liquid; also, that in beer-coolers having elbows these have been provided with projections on their upper and lower sides, and that through the openings made in said projections the upright rods are passed from the bottom to the top; nor do I claim such.

What I claim is—

1. In a beer-cooler, the combination, with its series of pipes A, of the elbows B, cast with sleeve *b*, forming, when joined the one top of the other, the projecting closing sides $b'$, by means whereof the flow of the beer is confined, in the manner and for the purposes set forth.

2. In a beer-cooler, the series of pipes A, the elbows B, cast with sleeves *b*, forming, when joined the one top of the other, the inclosing passage-ways for the rods *c*, as shown and described, and the top and bottom supports, D D', all said parts in combination, as and for the purposes set forth.

3. In combination with the trough-support D, carrying the pivoted trough E, having lugs at $g^2$, the pivoted hand-lever having arm at $g'$ and spring at $g^3$, by means whereof said trough can be secured in adjusted position, as and for the purposes set forth.

4. In a beer-cooler, the combination consisting of the pipes A, the elbows B, having sleeves b, the rods c, the supports D D', the pivoted trough E, and the hand-lever G, having spring and projecting arm to secure said trough, said parts, with or without the inside trough, F, all constructed to operate as and for the purposes set forth.

PHILLIP SEIBEL.

Witnesses:
 WILLIAM W. HERTHEL,
 JOHN W. HERTHEL.